US012265346B2

(12) United States Patent
Murakami

(10) Patent No.: US 12,265,346 B2
(45) Date of Patent: Apr. 1, 2025

(54) IMAGE FORMING APPARATUS

(71) Applicant: Toshiba Tec Kabushiki Kaisha, Tokyo (JP)

(72) Inventor: Kiyotaka Murakami, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/338,292

(22) Filed: Jun. 20, 2023

(65) Prior Publication Data

US 2024/0201619 A1 Jun. 20, 2024

(30) Foreign Application Priority Data

Dec. 19, 2022 (JP) ................................ 2022-202228

(51) Int. Cl.
*G03G 15/20* (2006.01)
*B41J 3/50* (2006.01)

(52) U.S. Cl.
CPC ............ *G03G 15/2003* (2013.01); *B41J 3/50* (2013.01)

(58) Field of Classification Search
CPC ............................... G03G 15/2039; B41J 3/50
See application file for complete search history.

(56) References Cited

U.S. PATENT DOCUMENTS 11,347,168 B1 5/2022 Ueta
2004/0257601 A1* 12/2004 Tomiyasu ........ G06K 19/07758 455/66.1
2015/0286174 A1* 10/2015 Yamamoto ......... G03G 15/2039 399/69
2020/0257229 A1* 8/2020 Sato .................. G03G 15/2032

FOREIGN PATENT DOCUMENTS

JP 2007-206161 A 8/2007
JP 2007-206162 A 8/2007
JP 2009-122467 A 6/2009

OTHER PUBLICATIONS

Machine Translation of JP 2007-206161. (Year: 2007).*

* cited by examiner

*Primary Examiner* — Carla J Therrien
(74) *Attorney, Agent, or Firm* — Kim & Stewart LLP

(57) ABSTRACT

An image forming apparatus configured to form an image on a medium and write data to a wireless tag attached to the medium, includes a fixing device including a heater and configured to fix the image formed on the medium by heat, and a controller configured to control the fixing device to heat a first region of the medium to which the wireless tag is not attached at a first temperature, and control the fixing device to heat a second region of the medium to which the wireless tag is attached at a second temperature that is lower than the first temperature.

16 Claims, 13 Drawing Sheets

IMAGE FORMING APPARATUS

CROSS-REFERENCE TO RELATED APPLICATION(S)

This application is based upon and claims the benefit of priority from Japanese Patent Application No. 2022-202228, filed Dec. 19, 2022, the entire contents of which are incorporated herein by reference.

FIELD

Embodiments described herein relate generally to an image forming apparatus, a method carried out by an image forming apparatus, and a non-transitory computer readable medium storing a program for forming an image.

BACKGROUND

There is an image forming apparatus that can communicate with a wireless tag embedded in or attached to a print medium and write data into the wireless tag when printing an image on the print medium. Such an image forming apparatus heats the print medium for fixing an image onto the print medium, and thus results in heating the attached wireless tag. This heating can cause malfunctioning of the wireless tag.

SUMMARY OF THE INVENTION

Embodiments of the present invention provide an image forming apparatus and a method capable of preventing a wireless tag attached to a print medium from malfunctioning by heat.

In one embodiment, an image forming apparatus configured to form an image on a medium and write data to a wireless tag attached to the medium, comprises: a fixing device including a heater and configured to fix the image formed on the medium by heat; and a controller configured to: control the fixing device to heat a first region of the medium to which the wireless tag is not attached at a first temperature, and control the fixing device to heat a second region of the medium to which the wireless tag is attached at a second temperature that is lower than the first temperature.

DETAILED DESCRIPTION

Figure 1:
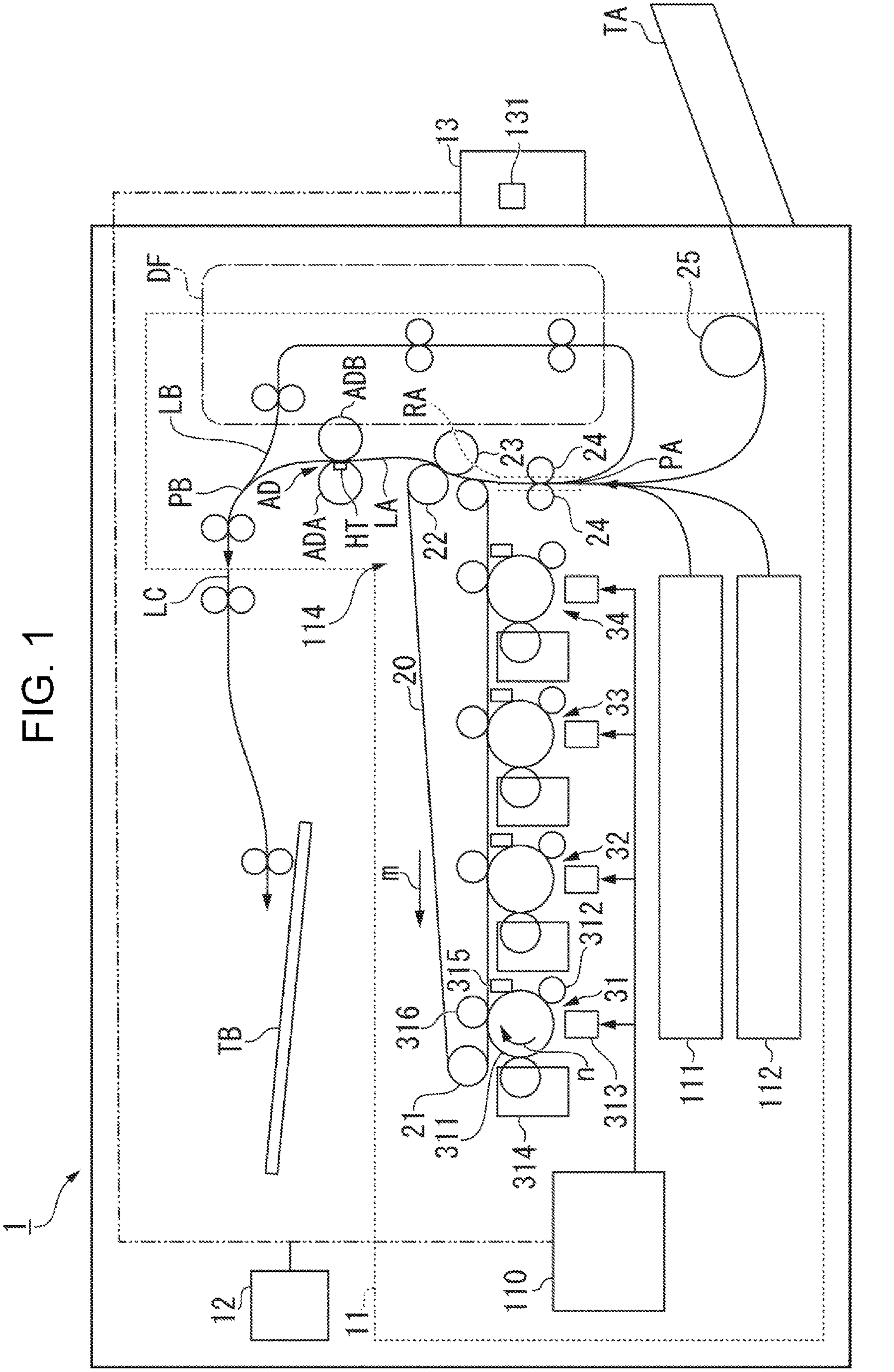
FIG. 1 is a configuration diagram of an image forming apparatus according to an embodiment.

Embodiments of this disclosure will be described with reference to the drawings. In the drawings, the same components are denoted by the same reference numerals. In this disclosure, an image forming apparatus 1 will be described as an example.

(Configuration of Image Forming Apparatus)

A configuration of the image forming apparatus 1 will be described with reference to FIG. 1. FIG. 1 is a diagram illustrating an example of the configuration of the image forming apparatus 1 according to an embodiment.

The image forming apparatus 1 forms an image on a print medium, and is, for example, a multifunction peripheral (MFP), a copier, a printer, or the like. The image forming apparatus 1 is arranged, for example, in a workplace. The print medium is a medium to be processed by the image forming apparatus 1 for image formation. The print medium may be any sheet-like medium on which an image can be formed or printed on at least one of both surfaces. For example, the print medium is a printing sheet, a plastic film, or the like.

The image forming apparatus 1 specifies a type of a print medium to be subjected to a process desired by the user in accordance with an operation received from the user. The print medium is classified by the size of the print medium, the thickness of the print medium, the material of the print medium, and the presence or absence of a wireless tag. The image forming apparatus 1 can form an image on a print medium having one or more wireless tags. The image forming apparatus 1 can also form an image on a print medium without any wireless tags.

Figure 2:
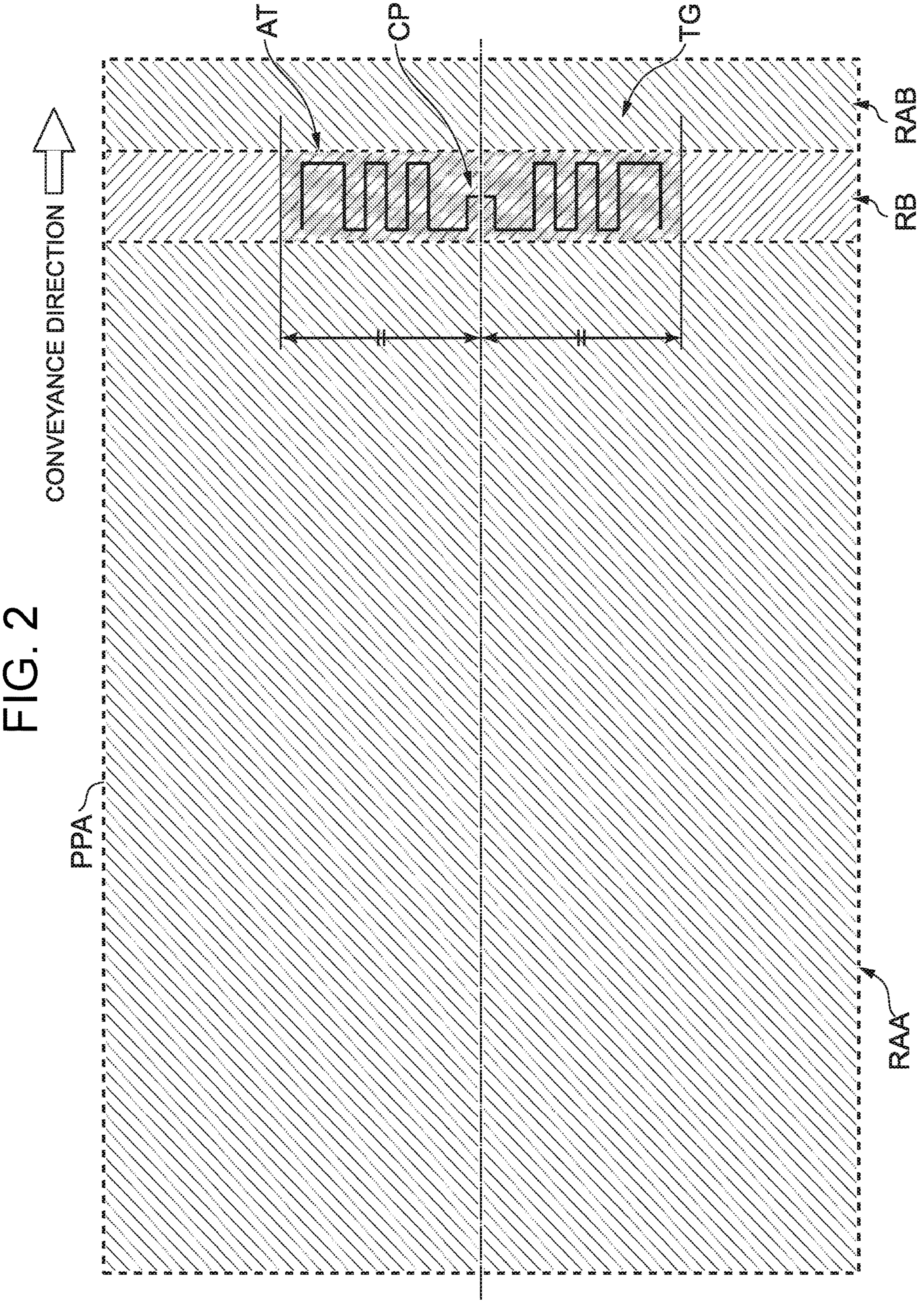
FIG. 2 is a configuration diagram of a print medium to which a wireless tag is attached.

The wireless tag is, for example, a radio frequency identification (RFID) tag, but is not limited thereto. FIG. 2 is a diagram illustrating an example of a configuration of a print medium PPA to which a wireless tag TG is attached. The arrow illustrated in FIG. 2 indicates a conveyance direction in which the print medium PPA is conveyed in the image forming apparatus 1. The wireless tag TG comprises an integrated circuit (IC) chip CP and an antenna AT. The IC chip CP writes and reads tag information. The antenna AT is connected to the IC chip CP and configured to receive the tag information written to the IC chip CP, transmit the tag information read from IC chip CP to the image forming apparatus 1, and the like.

The image forming apparatus 1 can detect the position of the wireless tag TG in the conveyance direction on the print medium PPA. Therefore, the image forming apparatus 1 can distinguish a region on the print medium PPA into two types of regions arranged in the conveyance direction, that is, a first region not including the wireless tag TG and a second region including the wireless tag TG. The first region is a rectangular region that does not include the wireless tag TG. The second region is a rectangular region including the wireless tag TG. For example, the image forming apparatus 1 detects the position of the wireless tag TG in the conveyance direction on the print medium PPA. In one embodiment, based on the detection position, the image forming apparatus 1 distinguishes a first region RAA that does not include the wireless tag TG from a second region RB that includes the wireless tag TG and another first region RAB that does not include the wireless tag TG, as illustrated in FIG. 2. In the embodiment shown in FIG. 2, three regions including the first region RAA, the second region RB, and the first region RAB, are arranged along the conveying direction in this order.

The image forming apparatus 1 forms an image on a print medium of a type specified in advance in accordance with the operation input by the user. For example, when the specified print medium is a print medium having one or more wireless tags, the image forming apparatus 1 writes tag information to each of the wireless tags attached to the print medium. After writing the tag information to the one or more wireless tags, the image forming apparatus 1 forms an image on the print medium. After forming the image on the print medium, the image forming apparatus 1 heats the print medium on which the image is formed, and fixes the image on the print medium. After fixing the image on the print medium, the image forming apparatus 1 discharges the print medium.

The wireless tag attached to the print medium is heated together with the print medium during the heating process. Due to this heating, the wireless tag attached to the print medium may become defective. The defect occurring in the wireless tag is, for example, a defect related to communication between a device that writes/reads tag information and the wireless tag, a deformation of the print medium caused by heat generation of the wireless tag, or the like.

Therefore, in the heating of the print medium, the image forming apparatus 1 controls the temperature at which the second region including the wireless tag in the region on the print medium is heated to be lower than the temperature at which the first region not including the wireless tag in the region on the print medium is heated. For example, when the print medium PPA shown in FIG. 2 is heated, the image forming apparatus 1 heats the second region RB at a lower temperature than the temperature at which the first region RAA and the first region RAB are heated. As a result, the image forming apparatus 1 can prevent the occurrence of a defect in the wireless tag attached to the print medium.

The image forming apparatus 1 includes, for example, a printer unit 11, a control panel 12, a wireless tag communication device 13, a manual feed tray TA, and a sheet discharge tray TB. In addition to the printer unit 11, the control panel 12, the wireless tag communication device 13, the manual feed tray TA, and the sheet discharge tray TB, the image forming apparatus 1 may include other members, other devices, and the like. The image forming apparatus 1 may not include the wireless tag communication device 13 in the housing. In this case, the wireless tag communication device 13 is communicably connected to the image forming apparatus 1 via an interface circuit.

The printer unit 11 includes a controller 110, a sheet feed cassette 111, a sheet feed cassette 112, and an image forming unit 114.

The controller 110 controls the entire image forming apparatus 1. In other words, the controller 110 controls each of the printer unit 11, the control panel 12, the wireless tag communication device 13, and the image forming unit 114.

The sheet feed cassette 111 stores a print medium of a type chosen by the user. As an example, a case where a print medium to which a wireless tag is attached is stored in the sheet feed cassette 111 will be described.

The sheet feed cassette 112 stores a print medium of another type chosen by the user. As an example, a case will be described in which the sheet feed cassette 112 stores a print medium to which a wireless tag is not attached.

The control panel 12 includes an input unit and a display unit.

The input unit receives an operation input by the user. The input unit is an input device, and is, for example, a touch pad, an input key, or the like. The input unit outputs information indicating the operation input by the user to the controller 110.

The display unit displays an image corresponding to the operation received via the input unit. The display unit is a display device, and is, for example, a liquid crystal display, an organic Electro Luminescence (EL) display, or the like. Note that the display unit may be configured integrally with the input unit as a touch panel.

The image forming unit 114 conveys a print medium and forms an image indicated by the image data acquired from the controller 110 on the print medium under the control of the controller 110. For convenience of explanation, forming an image on a print medium will be referred to as printing. The configuration of the image forming unit 114 will be described later.

The wireless tag communication device 13 includes an antenna 131 that radiates radio waves to a predetermined radiation region RA on the conveyance path along which a print medium is conveyed in the image forming apparatus 1. The antenna 131 may be constituted by a plurality of antennas instead of a single antenna.

The wireless tag communication device 13 causes the antenna 131 to radiate radio waves toward the radiation region RA under the control of the controller 110. As a result, the wireless tag communication device 13 can write the tag information to one or more wireless tags attached to a print medium. The method of writing the tag information to the wireless tag may be a known method or a method developed from now on. Therefore, the description of the method of writing the tag information to the wireless tag is omitted.

(Configuration of Image Forming Unit)

Hereinafter, the configuration of the image forming unit 114 will be described.

The image forming unit 114 includes an intermediate transfer belt 20. The image forming unit 114 includes a driven roller 21, a backup roller 22, a secondary transfer roller 23, two registration rollers 24, and a manual feed roller 25. The image forming unit 114 includes four sets of image forming stations: an image forming station 31, an image forming station 32, an image forming station 33, and an image forming station 34. The image forming unit 114 includes a fixing device AD and a duplex printer DF.

The intermediate transfer belt 20 is a belt to which a toner image is primarily transferred by four sets of image forming stations. The intermediate transfer belt 20 is supported by the driven roller 21, the backup roller 22, and the like. The intermediate transfer belt 20 rotates in a direction indicated by the arrow "m" in FIG. 1. More specifically, the image forming unit 114 rotates the intermediate transfer belt 20 in this direction by a motor (not shown) under the control of the controller 110.

The image forming station 31 is a yellow (Y) image forming station. The image forming station 32 is a magenta (M) image forming station. The image forming station 33 is a cyan (C) image forming station. The image forming station 34 is a black (K) image forming station. In the image forming unit 114, the four sets of image forming stations are disposed on the lower side of the intermediate transfer belt 20 along the rotation direction of the intermediate transfer belt 20.

The image forming station 31 includes a photoconductor drum 311, a charger 312, an exposure scanning head 313, a developing device 314, a photoconductor cleaner 315, and a primary transfer roller 316. In the image forming station 31, the charger 312, the exposure scanning head 313, the developing device 314, the photoconductor cleaner 315, and the primary transfer roller 316 are disposed around the photoconductor drum 311 that rotates in a direction indicated by the arrow "n" in FIG. 1. The primary transfer roller 316 faces the photoconductor drum 311 via the intermediate transfer belt 20.

The configurations of the image forming station 32, the image forming station 33, and the image forming station 34 are the same as those of the image forming station 31. Therefore, the configurations of the image forming station 32, the image forming station 33, and the image forming station 34 will not be described below.

The secondary transfer roller 23 faces the backup roller 22 via the intermediate transfer belt 20. The secondary transfer roller 23 secondarily transfers the toner image primarily transferred to the intermediate transfer belt 20 to a print medium passing between the secondary transfer roller 23 and the intermediate transfer belt 20.

The two registration rollers 24 convey the print medium taken out from each of the sheet feed cassette 111, the sheet feed cassette 112, and the manual feed tray TA by a conveyance device (not shown) between the secondary transfer roller 23 and the intermediate transfer belt 20.

The manual feed roller 25 takes out the print medium from the manual feed tray TA and conveys the print medium to the two registration rollers 24.

The fixing device AD fixes the toner image on the print medium after the toner image is secondarily transferred by the secondary transfer roller 23. More specifically, the fixing device AD heats the print medium while conveying the print medium by a roller, and fixes the toner image secondarily transferred to the print medium on the print medium.

The duplex printer DF is an apparatus that conveys the print medium after the toner image is fixed to the front surface by the fixing device AD to the two registration rollers 24. The print medium is conveyed to the duplex printer DF after the front surface and the back surface are turned upside down. Therefore, the print medium conveyed between the two registration rollers 24 via the duplex printer DF is imaged on the back surface via the secondary transfer roller 23 and the fixing device AD.

(Operation of Image Forming Unit)

Hereinafter, the operation of the image forming unit 114 will be described.

First, the operations of the four image forming stations will be described by taking the operation of the image forming station 31 as an example.

The image forming station 31 charges the photoconductor drum 311 with the charger 312, and then exposes the photoconductor drum with the exposure scanning head 313. Accordingly, the image forming station 31 forms an electrostatic latent image on the photoconductor drum 311. Thereafter, the image forming station 31 causes the developing device 314 to develop the electrostatic latent image on the photoconductor drum 311. The developing device 314 develops the electrostatic latent image on the photoconductor drum 311 as a toner image using a two-component developer formed by toner and a carrier. The primary transfer roller 316 performs the primary transfer of the toner image formed on the photoconductor drum 311 to the intermediate transfer belt 20 in this manner. After the primary transfer, the photoconductor cleaner 315 removes the toner remaining on the photoconductor drum 311.

The image formation station 31, the image formation station 32, the image formation station 33, and the image formation station 34 each form a color toner image on the intermediate transfer belt 20 by the primary transfer roller 316. The color toner image is formed by sequentially superimposing the toner images of Y (yellow), M (magenta), C (cyan), and K (black).

Next, the operation of the secondary transfer roller 23 will be described. The secondary transfer roller 23 secondarily transfers the color toner images on the intermediate transfer belt 20 to the print medium passing between the secondary transfer roller 23 and the intermediate transfer belt 20. In the following description, a "toner image" may be either a color toner image or a toner image of only one color. The toner image may be a toner image using decolorable toner.

Next, an operation of transporting the print medium by the image forming unit 114 will be described.

The print medium taken out from each of the sheet feed cassette 111, the sheet feed cassette 112, and the manual feed tray TA is pushed against the nip of the two registration rollers 24 by a conveyance device (not shown). This allows the tip of the print medium to be aligned along the nip. Thereafter, the two registration rollers 24 convey the print medium between the secondary transfer roller 23 and the intermediate transfer belt 20 in accordance with the timing at which the image forming unit 114 transfers the toner image to the print medium. The conveyance path along which the print medium taken out from each of the sheet feed cassette 111, the sheet feed cassette 112, and the manual feed tray TA is conveyed to the two registration rollers 24 merges at a merging portion PA shown in FIG. 1.

In the image forming unit 114, three conveyance paths such as a conveyance path LA, a conveyance path LB, and a conveyance path LC are formed by the two registration rollers 24, the fixing device AD, and a plurality of rollers in the duplex printer DF. The conveyance path LA is a conveyance path from the merging portion PA to the branching portion PB illustrated in FIG. 1. The conveyance path LB is a conveyance path passing through the duplex printer DF and extends from the branch portion PB to the merging portion PA. The conveyance path LC is a conveyance path from the branch portion PB to the sheet discharge tray TB.

The two registration rollers 24 start to rotate in accordance with the position of the toner image of the rotating intermediate transfer belt 20, and move the print medium to the position of the secondary transfer roller 23. As a result, the toner image formed on the intermediate transfer belt 20 is secondarily transferred to the print medium by the secondary transfer roller 23. After the toner image is secondarily transferred to the print medium, the secondary transfer roller 23 conveys the print medium to the fixing device AD along the conveyance path LA.

Figure 3:
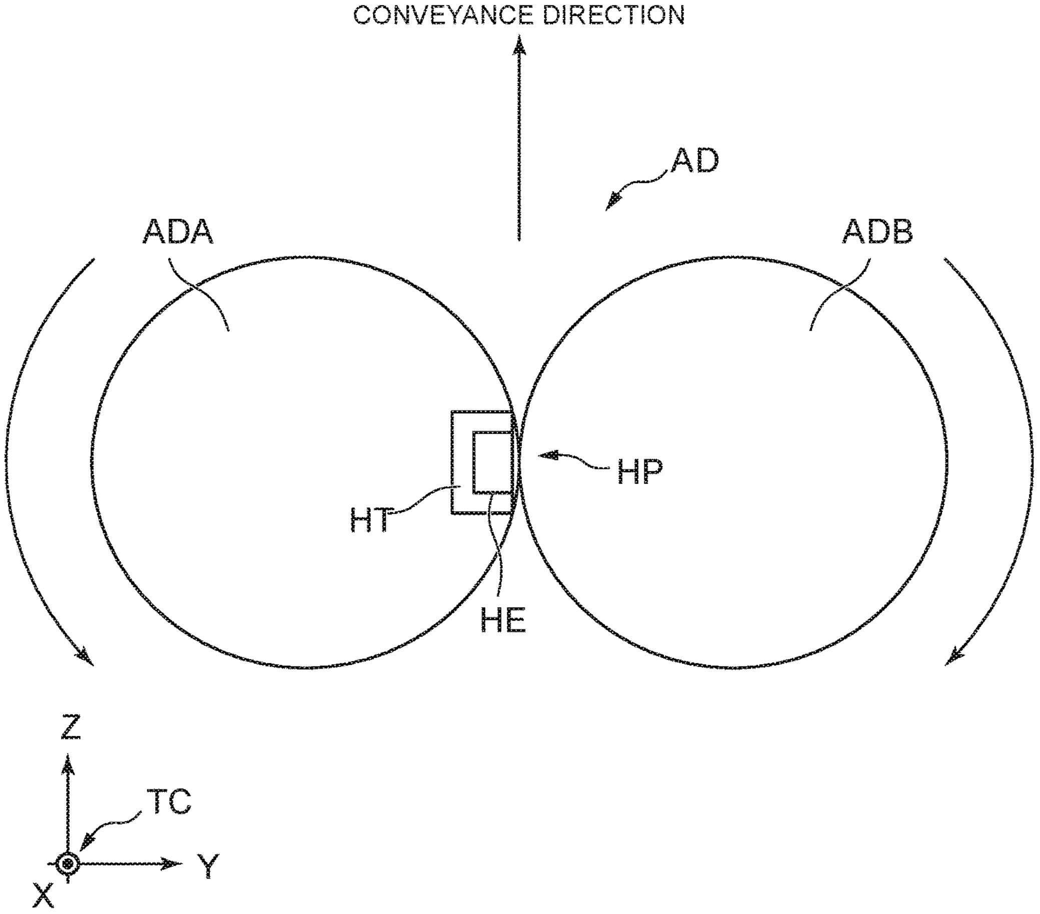
FIG. 3 is a diagram illustrating an exemplary configuration of a fixing device of the image forming apparatus.

The fixing device AD fixes the toner image secondarily transferred to the print medium conveyed from the secondary transfer roller 23 to the print medium while conveying the print medium. FIG. 3 is a diagram illustrating an exemplary configuration of the fixing device AD. The fixing device AD includes, for example, a fixing member ADA, a pressing member ADB facing the fixing member ADA, and a heating unit HT. A three-dimensional coordinate system TC is a three-dimensional Cartesian coordinate system showing the orientation of each element in the drawing.

The fixing member ADA is a member having an endless peripheral surface. For example, the fixing member ADA is an endless belt or roller. The fixing member ADA abuts on the outer peripheral surface of the pressing member ADB. The fixing member ADA rotates together with the pressing member ADB in contact with each other. A heating unit HT is provided inside the fixing member ADA. A support member that rotatably supports the fixing member ADA is provided inside the fixing member ADA. In FIG. 1 and FIG. 3, the supporting member is omitted in order to simplify the drawing. The fixing member ADA rotates about the rotational axis that is parallel to the X axis of the three-dimensional coordinate system TC shown in FIG. 3.

The pressing member ADB is a roller that abuts on the outer peripheral surface of the fixing member ADA. The driving force of the motor is transmitted to the pressing member ADB via a gear or the like. In other words, the pressing member ADB is rotated by the driving of the motor. The pressing member ADB rotates about the rotational axis that is parallel to the X-axis of the three-dimensional coordinate system TC shown in FIG. 3.

The pressing member ADB is pressed against the outer peripheral surface of the fixing member ADA by a biasing member such as a spring. The pressing member ADB forms a nip with the fixing member ADA by being pressed against the fixing member ADA. In other words, the pressing member ADB forms the nip with the fixing member ADA by contacting the fixing member ADA. In the fixing device AD, instead of the configuration in which the pressing member ADB is pressed against the outer peripheral surface of the fixing member ADA by the biasing member, the fixing member ADA may be pressed against the outer peripheral surface of the pressing member ADB by the biasing member.

The heating unit HT is a heater that heats the fixing member ADA. For example, the heating unit HT is a lamp-type heating device and includes a heating element HE. The heating element HE is slidably contacted with the fixing member ADA. The heating element HE may be configured to be in slidable contact with the fixing member ADA via a protective layer made of glass or the like, or may be configured to be in slidable contact with the fixing member ADA without the protective layer being interposed. The heating unit HT causes the heating element HE to generate heat, and heats the fixing member ADA contacting the heating element HE. In the exemplary embodiments illustrated in FIGS. 1 and 3, the heating unit HT heats the region corresponding to the heating position HP on the outer peripheral surface of the fixing member ADA, where the fixing member ADA and the pressing member ADB are in contact. Accordingly, the heating unit HT can heat the front face of the print medium passing the nip between the fixing member ADA and the pressing member ADB. In FIG. 3, the heating unit HT is shown as a rectangular object in order to simplify the drawing.

Figure 4:
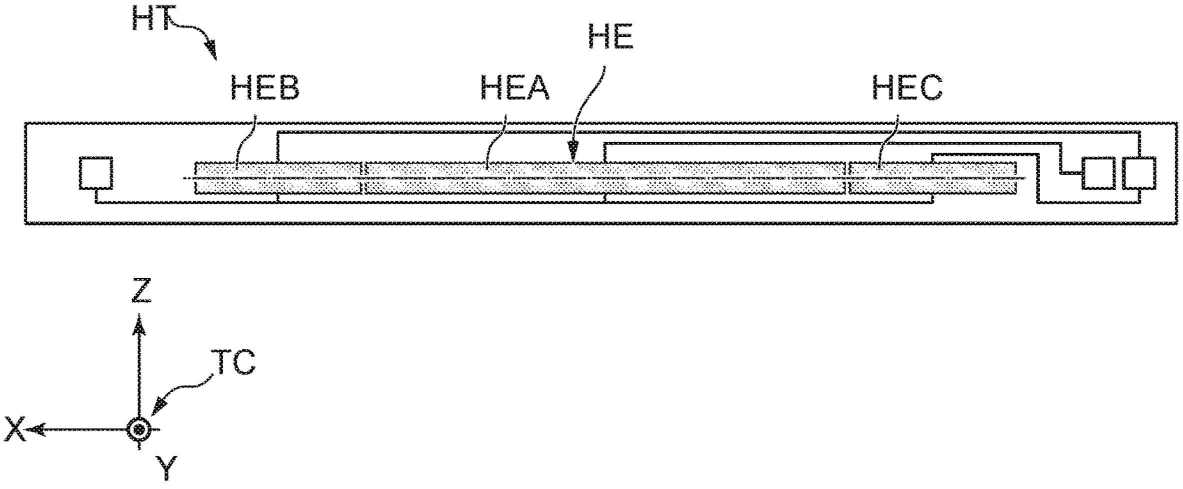
FIGS. 4-6 depict examples of a heating element included in a heating unit of the fixing device shown in FIG. 3.

FIG. 4 is a diagram illustrating an exemplary configuration of the heating element HE included in the heating unit HT illustrated in FIG. 3. As illustrated in FIG. 4, the heating element HE is a heating element that extends in the axial direction of the rotating shaft of the fixing member ADA. In the embodiment shown in FIG. 4, the heating element HE is constituted by three heating elements: a heating element HEA, a heating element HEB, and a heating element HEC. The heating element HEA is a heating element that heats a region near the center of the region to be heated in the axial direction. The heating element HEB is a heating element that heats one of both axial ends of the heated region. The heating element HEC is a heating element that heats the other of both axial ends of the heated region. Therefore, in this embodiment, the heating element HEB, the heating element HEA, and the heating element HEC are arranged in this order in the negative direction of the X-axis in the three-dimensional coordinate system TC. Thus, the heating element HE can heat the entire heated region. These three heating elements are formed of, for example, a resistor such as a silver-palladium alloy, and generate heat by energization by the controller 110. In this example, the three heating elements are provided on a substrate on which wiring is printed. The wiring illustrated in FIG. 4 is merely an example. Some or all of the three heating elements HEA, HEB, and HEC may be integrally formed. A more detailed configuration of the heating element HE shown in FIG. 4 is described in, for example, JP-A-2021-039193. Therefore, in the present embodiment, detailed explanation of the configuration of the heating element HE shown in FIG. 4 will be omitted.

Figure 5:
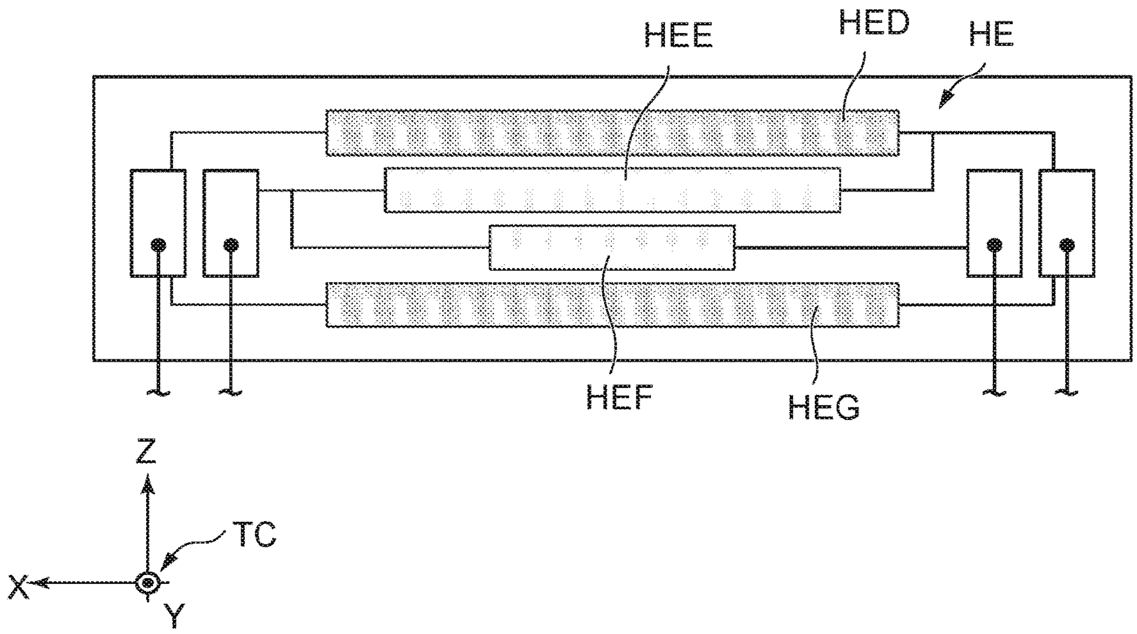

Instead of the configuration illustrated in FIG. 4, the heating element HE of the heating unit HT may be configured by a plurality of heating elements arranged in the conveyance direction, as illustrated in FIG. 5. FIG. 5 is a diagram illustrating another exemplary configuration of the heating element HE included in the heating unit HT illustrated in FIG. 3. In the example shown in FIG. 5, the heating element HE is composed of four heating elements HED, HEE, HEF, and HEG. The heating element HED is a heating element that heats the entire heated region. The heating element HEE is a heating element that heats a region narrower than the region heated by the heating element HED and wider than the region heated by the heating element HEF. The heating element HEF is a heating element that heats a part of the region to be heated that is narrower than the region heated by the heating element HEE, near the center of the region to be heated in the axial direction. The heating element HEG is a heating element that heats the entire heated region. In the example, the heating element HEG, the heating element HEF, the heating element HEE, and the heating element HED are arranged in the positive direction of the Z-axis of the three-dimensional coordinate system TC, i.e., toward the conveyance direction. As a result, the heating element HE can heat the entire heated region. These four heating elements are formed of, for example, a resistor such as a silver-palladium alloy, and generate heat by energization by the controller 110. In this example, the four heating elements are provided on a substrate on which wiring is printed. The wiring illustrated in FIG. 5 is merely an example. Some or all of the four heating elements HED, HEE, HEF, and HEG may be integrally formed. A more detailed configuration of the heating element HE shown in FIG. 5 is described in, for example, JP-A-2021-162757. Therefore, in the present embodiment, a detailed explanation of the configuration of the heating element HE shown in FIG. 5 will be omitted.

Figure 6:
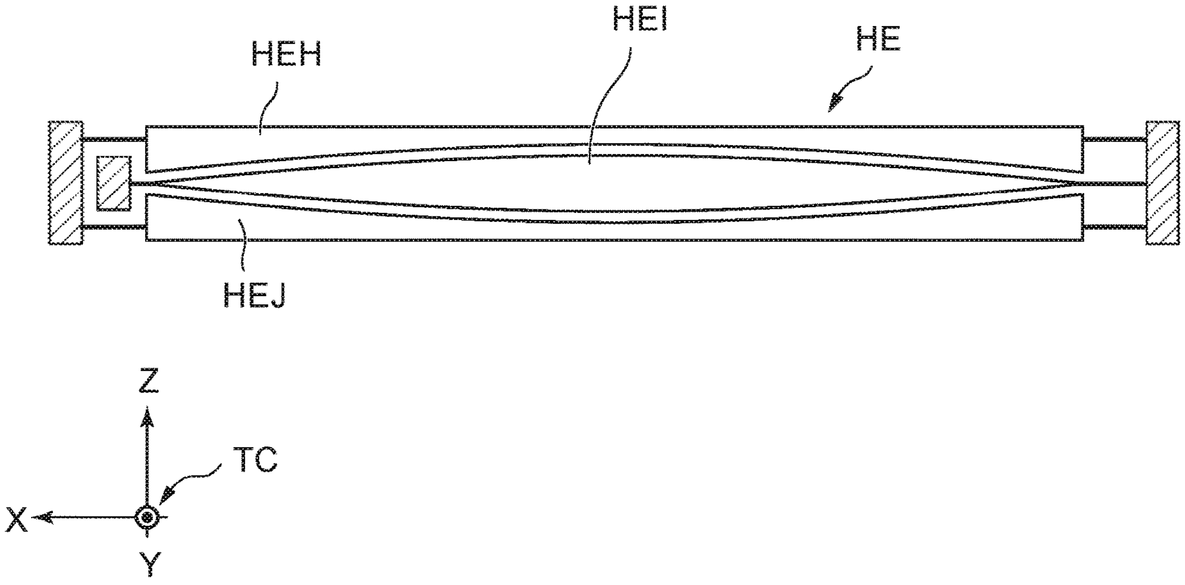

The heating element HE may be constituted by three heating elements as shown in FIG. 6. FIG. 6 is a diagram illustrating another exemplary configuration of the heating element HE included in the heating unit HT illustrated in FIG. 5. In the embodiment shown in FIG. 6, the heating element HE is constituted by three heating elements, namely a heating element HEH, a heating element HEI, and a heating element HEJ. These three heating elements HEH, HEI, and HEJ are heating elements having a shape in which the thickness changes in the direction in which the three heating elements extend. In the embodiment shown in FIG. 6, the heating element HEI is shaped like a convex lens in which, when viewed in the negative direction of the Y-axis of the three-dimensional coordinate system TC, a portion of the heating element HEI in the vicinity of the center in the axial direction of the rotating shaft of the fixing member ADA is bulged more than both ends of the heating element HEI. The heating element HEH is shaped like a concave lens in which a portion of a portion of the heating element HEH near the center in the axial direction is recessed from both ends of the heating element HEH so as to be fitted to the heating element HEI. The heating element HEJ is shaped like a concave lens in which a portion of a portion of the heating element HEJ near the center in the axial direction is recessed from both ends of the heating element HEJ so as to be fitted to the heating element HEI. Each of these three heating elements HEH, HEI, and HEJ is a heating element that heats the entire heated region. In this embodiment, the heating element HEJ, the heating element HEI, and the heating element HEH are arranged in the positive direction of the Z-axis in the three-dimensional coordinate system TC, that is, in the conveying direction. As a result, the heating element HE can heat the entire heated region. These three heating elements HEH, HEI, and HEJ are formed of, for example, a resistor such as a silver-palladium alloy, and generate heat by energization by the controller 110. In this example, the three heating elements are provided on a substrate on which wiring is printed. The wiring illustrated in FIG. 6 is merely an example. Some or all of the three heating elements may be integrally formed. A more detailed configuration of the heating element HE shown in FIG. 6 is described in, for example, JP-A-2019-144451. Therefore, in the present embodiment, detailed explanation of the configuration of the heating element HE shown in FIG. 6 will be omitted.

The lamp-type heating unit HT as shown in FIGS. 4 to 6 may be provided inside the pressing member ADB instead of being provided inside the fixing member ADA.

Figure 7:
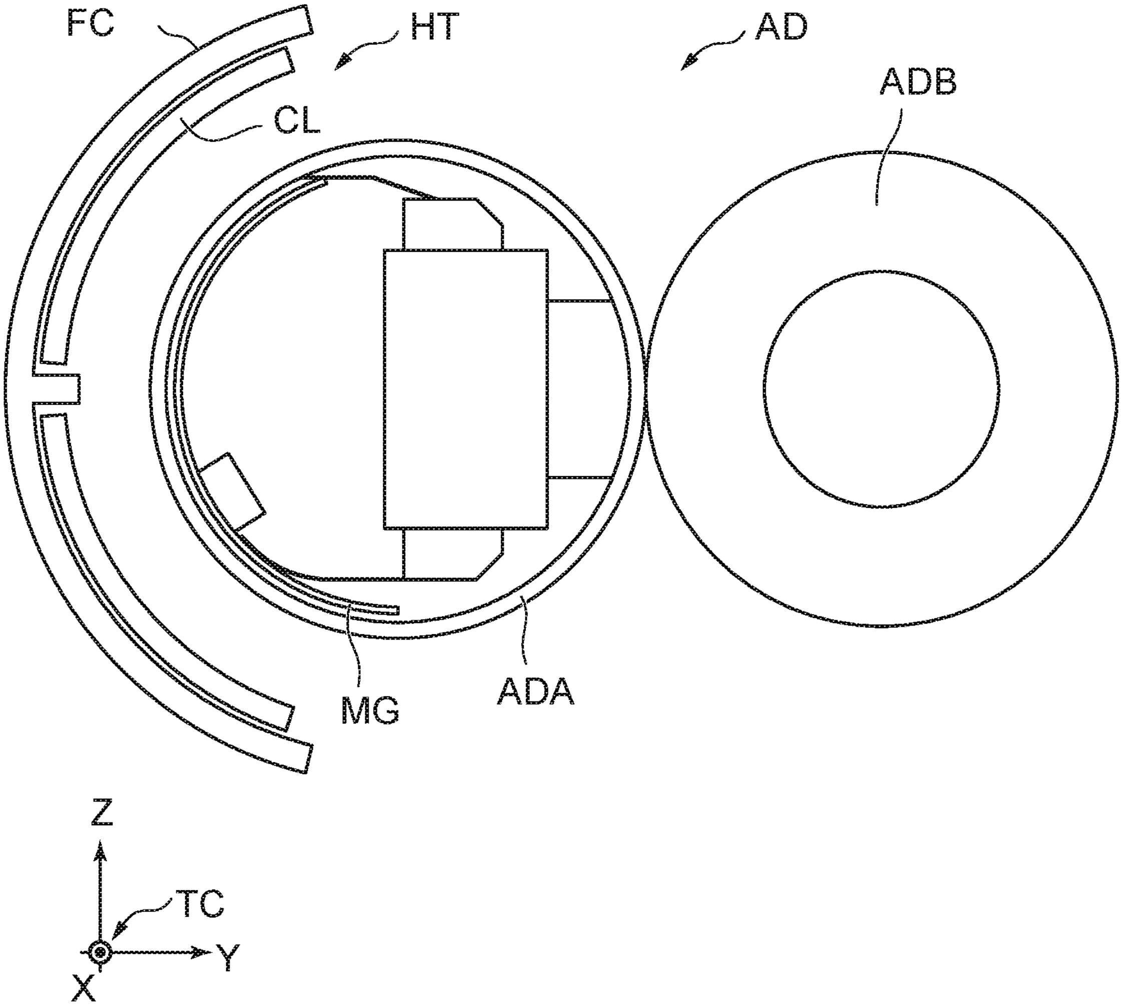
FIG. 7 is a diagram illustrating another exemplary configuration of the fixing device.

The heating unit HT may be a heating unit of an induction heating (IH) type as shown in FIG. 7 instead of the lamp-type heating unit as shown in FIGS. 4 to 6. FIG. 7 is a diagram illustrating another exemplary configuration of the fixing device AD. The heating unit HT included in the fixing device AD shown in FIG. 7 is an IH type heating device, and includes a ferrite core FC, an IH coil CL provided on the ferrite core FC, and a heating element MG that generates heat by a magnetic flux generated from the IH coil CL.

The ferrite core FC is provided outside the fixing member ADA so that the magnetic flux generated from the IH coil CL concentrates on the fixing member ADA. In the embodiment shown in FIG. 7, the ferrite core FC is curved along the outer peripheral surface of the fixing member ADA, and is provided at a position opposite to the position where the pressing member ADB is located among the positions opposed to the fixing member ADA.

The IH coil CL is a coil that is provided on the inner peripheral surface of the ferrite core FC and generates a magnetic flux corresponding to the alternating current supplied from the controller 110. The inner peripheral surface of the ferrite core FC is a surface of the surface of the ferrite core FC that faces the outer peripheral surface of the fixing member ADA. In other words, the inner peripheral surface of the ferrite core FC is a surface of the surface of the ferrite core FC facing the fixing member ADA. The IH coil CL heats the heating element MG provided inside the fixing member ADA by the generated magnetic flux.

The heating element MG may be any object that generates heat by the magnetic flux generated by the IH coil CL, and is, for example, an object made of a nickel-ferrite alloy, but is not limited thereto. The heating element MG is curved along the inner peripheral surface of the fixing member ADA, extends in the axial direction of the rotating shaft of the fixing member ADA, and slidably contacts the fixing member ADA inside the fixing member. As a result, the heating element MG can heat a region on the outer peripheral surface of the rotating fixing member ADA that is substantially opposite to the heating position HP. Consequently, the heating element MG can heat the front face of the print medium by the region that is moved to the heating position HP by rotating the fixing member ADA. The heating element MG may be in contact with the fixing member ADA via the protective layer described above, or may be in contact with the fixing member ADA without the protective layer being interposed therebetween. The heating element MG is supported by a support member (not shown) inside the fixing member ADA.

A more detailed configuration of the fixing device AD shown in FIG. 7 is described in, for example, JP-A-2019-124716. Therefore, in the present embodiment, detailed explanation of the configuration of the heating element HE shown in FIG. 7 will be omitted.

The configuration of each of the heating unit HT and the fixing device AD may be any other configuration as long as the function of the fixing device AD described in the present embodiment is not impaired.

With the above-described configuration, the fixing device AD includes the heating unit HT that heats a print medium, and heats the print medium by the heating unit HT at the heating position HP on the conveyance path where the print medium is conveyed, so that the toner image is fixed to the print medium. As a result, the toner image secondarily transferred by the secondary transfer roller 23 is formed as an image on the print medium. The fixing device AD conveys the print medium to the conveyance path LC after the images are formed on the print medium. The print medium conveyed to the conveyance path LC is discharged by a roller (not shown).

In the double-sided printing, after an image is formed on the front surface, the entire print medium passes through the branch portion PB, and then a roller (not shown) conveys the print medium to the conveyance path LB by a switchback. As a result, the front surface and the back surface of the print medium are turned over. Thereafter, the plurality of rollers in the duplex printer DF convey the print medium to the nip of the two registration rollers 24 along the conveyance path LB. The print medium on which the front surface and the back surface are turned upside down is conveyed along the conveyance path LA through the two registration rollers 24, and the toner image is fixed by the fixing device AD. As a result, an image is formed on the back surface of the print medium. The fixing device AD conveys the print medium on which images are formed on the back surface to the conveyance path LC and discharges the print medium.

As described above, the secondary transfer roller 23, the two registration rollers 24, the fixing device AD, and the various rollers in the duplex printer DF constitute a conveyance unit that conveys a print medium in the image forming apparatus 1.

(Detection of Position of Wireless Tag on Print Medium in Conveyance Direction)

As described above, in the image forming apparatus 1, during the heating of the print medium by the heating unit HT, the temperature for heating the second region including the wireless tag on the print medium is set to be lower than the temperature for heating the first region not including the wireless tag. For this reason, the image forming apparatus 1 detects the position of the wireless tag on the print medium in the conveyance direction, and specifies at least the second region among the first region and the second region, as described below. Hereinafter, a method of detecting the position of the wireless tag on a print medium in the conveyance direction will be described. For convenience of explanation, the position of the wireless tag on the print medium in the conveyance direction will be simply referred to as the position of the wireless tag.

The image forming apparatus 1 acquires wireless tag position information indicating the position of the wireless tag at the detection position on the conveyance path where a print medium is conveyed, which is located in front of the heating position HP.

The detection position is a position on the conveyance path with which the leading edge of the print medium can coincide while the print medium is sandwiched between the two registration rollers 24. The detection position is a position advanced by a predetermined distance from the nip of the two registration rollers 24 in the conveyance direction. The predetermined distance is, for example, about several centimeters, but is not limited thereto. However, the predetermined distance is determined as a distance at which the wireless tag attached to the print medium is not sandwiched by the two registration rollers 24. Therefore, the predetermined distance may be different depending on the type of the print medium. For example, the detection position is a position included in the above-described radiation region RA. The detection position may be a position with which the leading edge of the print medium cannot coincide while the print medium is sandwiched between the two registration rollers 24. The detection position may be a position not included in the radiation region RA.

Before the print medium is moved from the nip of the two registration rollers 24 to the position of the secondary transfer roller 23 by the two registration rollers 24, the image forming apparatus 1 makes the position of the leading end of the print medium coincide with the detection position. After the position of the leading end of the print medium coincides with the detection position, the image forming apparatus 1 stops the movement of the print medium by the two registration rollers 24 until a predetermined detection time elapses. The detection time may be any time as long as the time is longer than or equal to the time required for the image forming apparatus 1 to acquire the wireless tag position information, i.e., detect the wireless tag position. After stopping the movement of the print medium by the two registration rollers 24, the image forming apparatus 1 acquires the wireless tag position information until the detection time elapses. Thereafter, when it is determined that the detection time has elapsed, the image forming apparatus 1 resumes the movement of the print medium by the two registration rollers 24, and moves the print medium to the position of the secondary transfer roller 23 by the two registration rollers 24.

Figure 8:
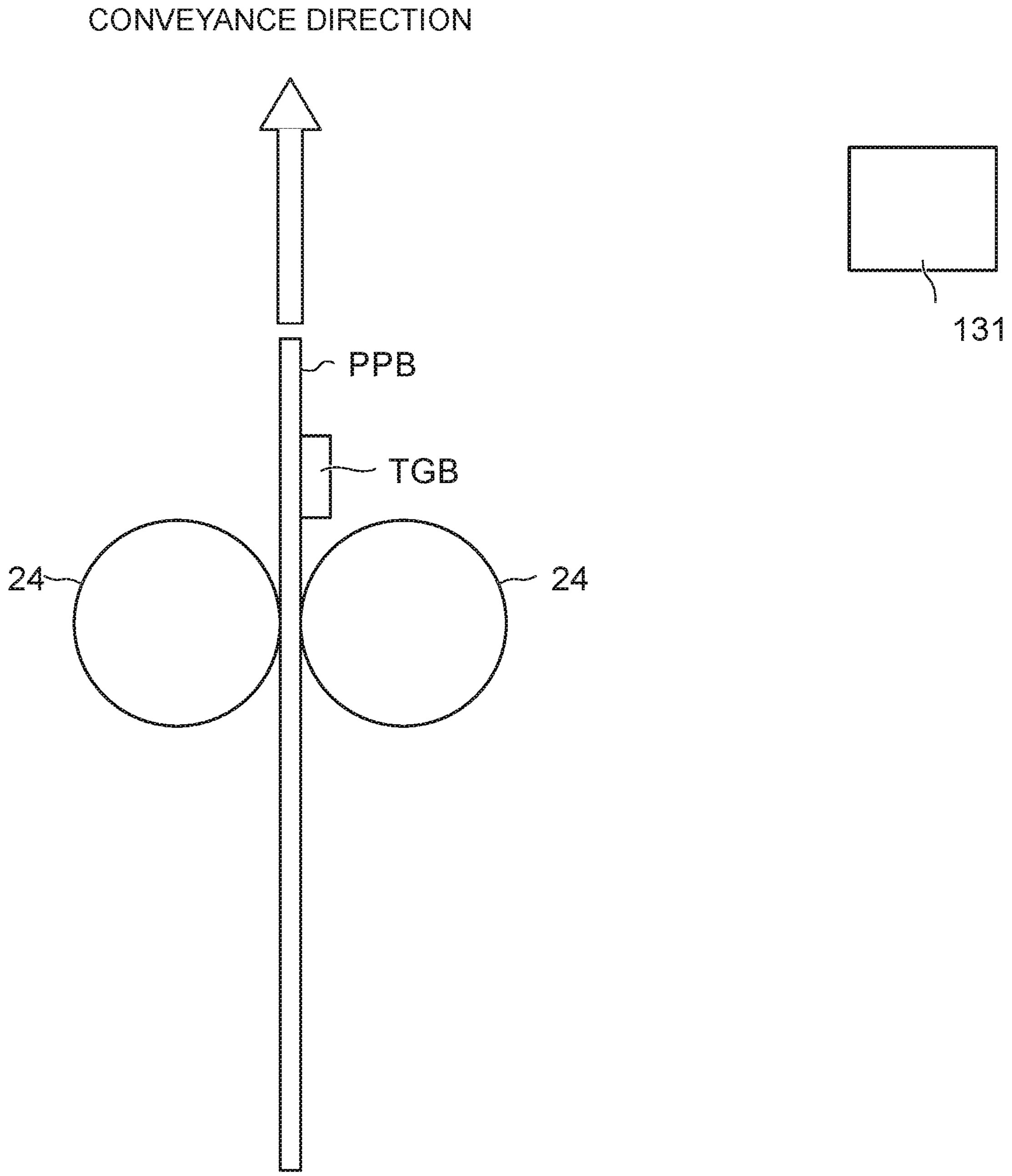
FIGS. 8 and 9 each depict a print medium sandwiched between two registration rollers and its leading edge coincides with a detection position.

When the position of the leading end of the print medium coincides with the detection position, the wireless tag attached to the print medium is positioned on the conveyance path at either a position closer to the secondary transfer roller 23 than the two registration rollers 24 or a position farther from the secondary transfer roller 23 than the two registration rollers 24. FIG. 8 depicts a print medium PPB sandwiched between the two registration rollers 24 and the leading edge of the print medium PPB coincides with the detecting position. FIG. 8 also shows the antenna 131 of the wireless tag communication device 13. The print medium PPB is provided with a wireless tag TGB. In the example illustrated in FIG. 8, the wireless tag TGB is positioned closer to the secondary transfer roller 23 than the two registration rollers 24 in the case.

Figure 9:
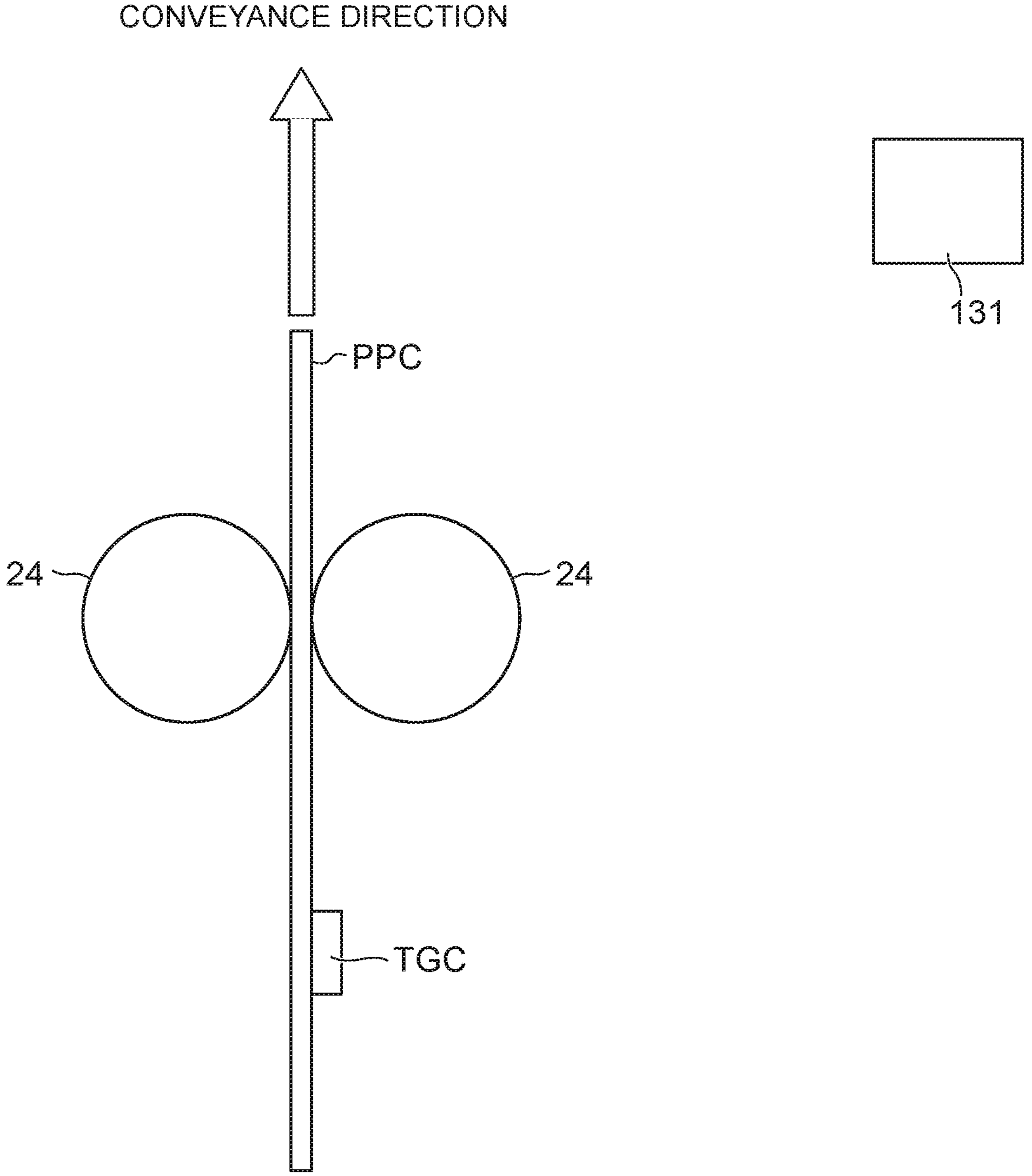

On the other hand, FIG. 9 depicts another print medium PPC sandwiched between the two registration rollers 24 and the leading edge of the print medium PPC coincides with the detecting position. FIG. 9 also shows the antenna 131 of the wireless tag communication device 13. In the example illustrated in FIG. 9, the distance from the nip of the two registration rollers 24 illustrated in FIG. 8 to the detection position is the same distance as the distance from the nip of the two registration rollers 24 illustrated in FIG. 9 to the detection position. The print medium PPC is provided with a wireless tag TGC. In the example illustrated in FIG. 9, the wireless tag TGC is located at a position farther from the secondary transfer roller 23 than the two registration rollers 24.

The wireless tag position information may be any information as long as the information indicates the position of the wireless tag. For example, when the image forming apparatus 1 includes a sensor that detects the position of the wireless tag, the image forming apparatus 1 detects the wireless tag position by acquiring information indicating the result output from the sensor as the wireless tag position information. For example, when the image forming apparatus 1 includes a sensor that detects other information indicating the position of the wireless tag, the image forming apparatus detects the wireless tag position by acquiring the other information detected by the sensor as the wireless tag position information. The image forming apparatus 1 can use the received signal strength indicator (RSSI) of the wireless tag as the other information. As an example, the case where the wireless tag position information is the received signal strength of the wireless tag will be described.

Figure 10:
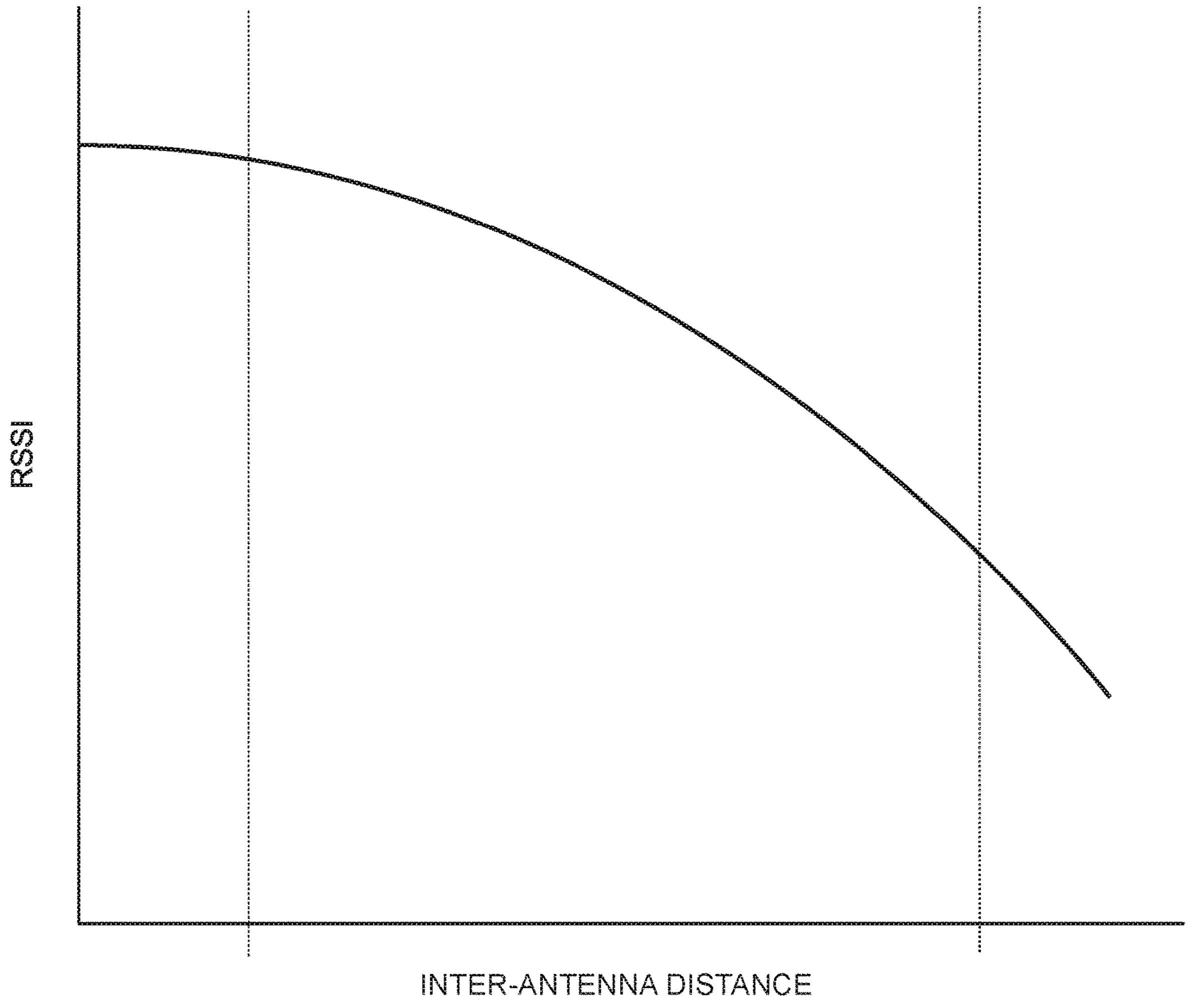
FIG. 10 depicts a relationship between an inter-antenna distance and a received signal strength indicator (RSSI).

The received signal strength correlates with the distance from the antenna 131 to the wireless tag. Specifically, as shown in FIG. 10, the received signal strength decreases monotonically as the distance increases. Therefore, the received signal strength can be treated as an alternative index indicating the distance. For convenience of explanation, the distance will be referred to as an inter-antenna distance. FIG. 10 depicts a relationship between the inter-antenna distance and the received signal strength.

When the received signal strength is detected, the image forming apparatus 1 can calculate the inter-antenna distance based on the correspondence information stored in advance and the received signal strength. The correspondence information is information in which the position of the wireless tag and the received signal strength are associated with each other. The correspondence information may be information in a table format in which the position of the wireless tag and the received signal strength are associated with each other, or may be information in another format in which the position of the wireless tag and the received signal strength are associated with each other.

Figure 11:
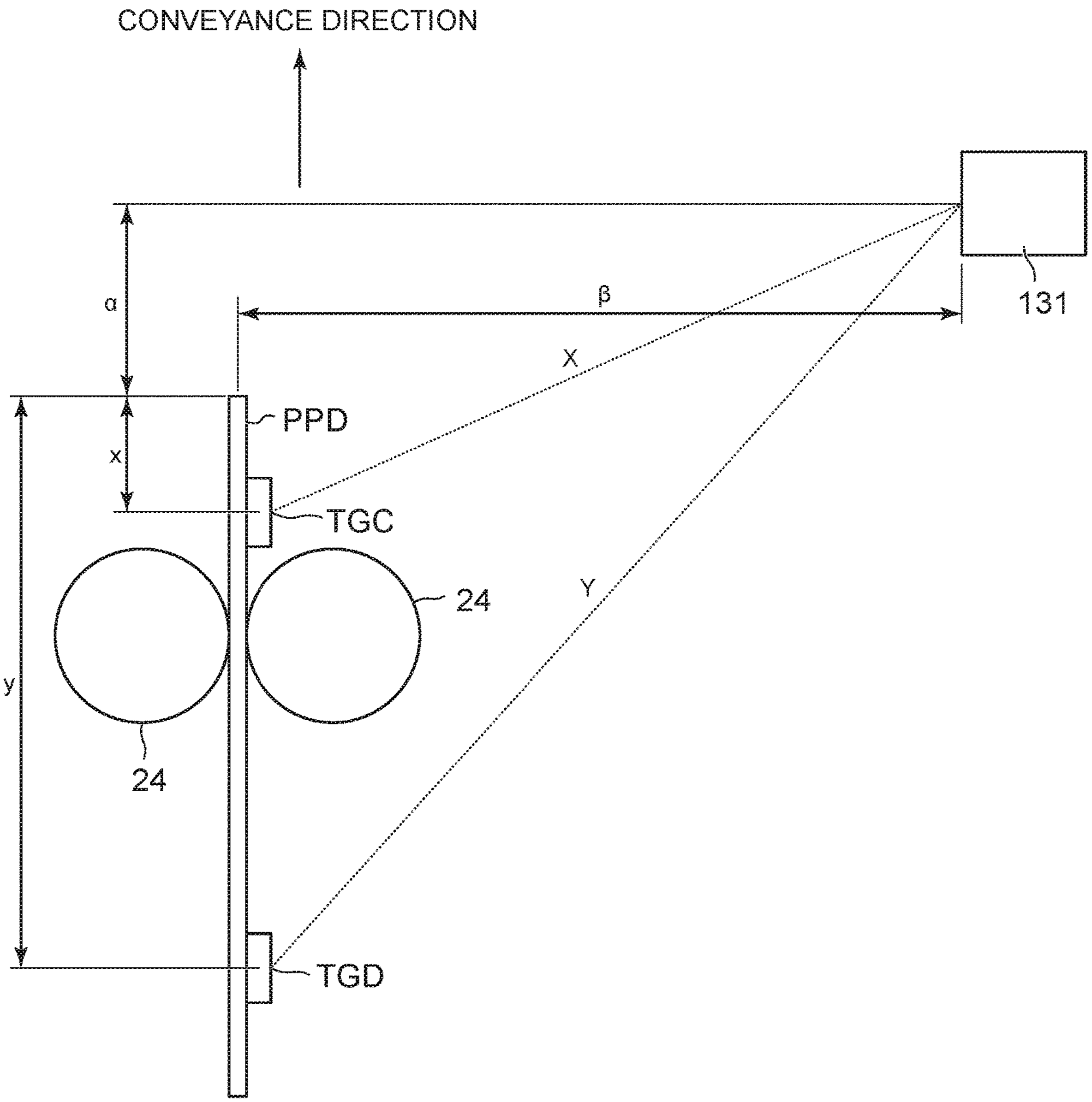
FIG. 11 depicts a method of identifying a position of a wireless tag based on the inter-antennas distance.

When the inter-antenna distance is calculated from the received signal strength, the image forming apparatus 1 can specify the position of the wireless tag based on the calculated inter-antenna position. FIG. 11 depicts a method of specifying the position of the wireless tag based on the inter-antenna distance. The print medium PPD illustrated in FIG. 11 is an exemplary print medium with a wireless tag TGC and/or TGD. In the embodiment illustrated in FIG. 11, the leading end of the print medium PPD is located at the detecting position. For example, the inter-antenna distance between the wireless tag TGC and the antenna 131 is the distance X illustrated in FIG. 11. On the other hand, the inter-antenna distance between the wireless tag TGD and the antenna 131 is the distance Y shown in FIG. 11.

The distance β shown in FIG. 11 indicates the length of the virtual normal line drawn from the antenna 131 to the conveyance path. The distance α shown in FIG. 11 indicates the length between the intersection point between the perpendicular line and the conveyance path and the detection position. The distance α and the distance β are predetermined values at the design stage of the image forming apparatus 1, and are known values. For this reason, for example, the image forming apparatus 1 can calculate the distance x from the detection position to the position of the wireless tag TGC by using the three-square theorem. Specifically, the image forming apparatus 1 can calculate the distance x as the position of the wireless tag TGC based on the following Expression (1).

$$x = -\alpha + \sqrt{(X2 - \beta 2)} \quad (1)$$

Similarly, the image forming apparatus 1 can calculate the distance Y from the detection position to the position of the wireless tag TGD by using the three-square theorem. Specifically, the image forming apparatus 1 can calculate the distance y as the position of the wireless tag TGD based on the following Expression (2).

$$y = -\alpha + \sqrt{(Y2 - \beta 2)} \quad (2)$$

As described above, the image forming apparatus 1 can calculate the position of the wireless tag using the received signal strength. As a result, the image forming apparatus 1 can specify at least the second region among the first region and the second region of the print medium.

In the image forming apparatus 1, when the leading edge of the print medium coincides with the detection position, a part or all of the print medium may be included inside the radiation region RA or may not be included inside the radiation region RA. In the embodiment shown in FIG. 1, the entire print medium is contained inside the radiation region RA.

(Functional Configuration of Controller)

Figure 12:
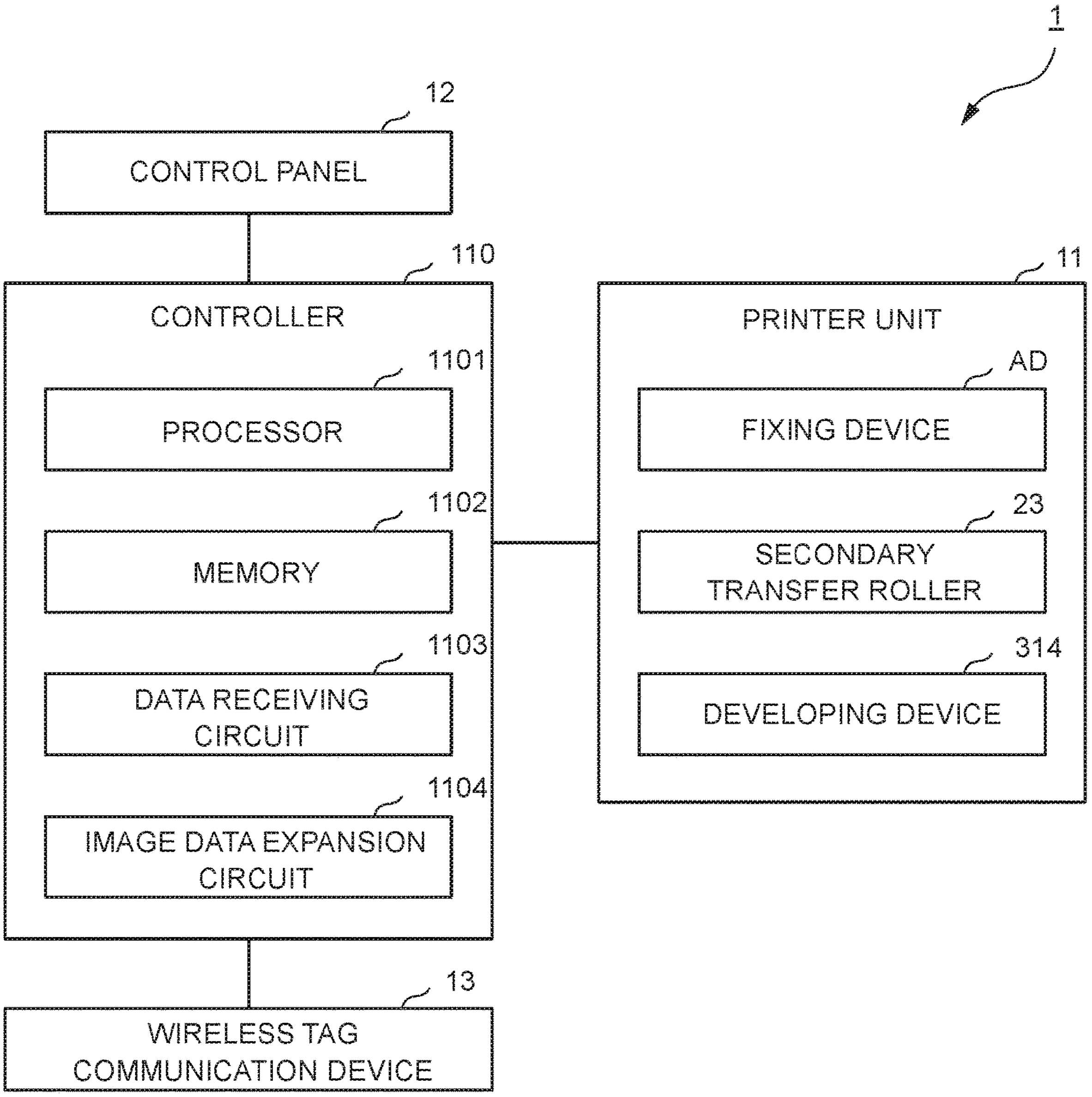
FIG. 12 is a functional block diagram of the image forming apparatus.

Next, the functional configuration of the controller 110 will be described with reference to FIG. 12. FIG. 12 is a diagram illustrating an example of the functional configuration of the controller 110.

As illustrated in FIG. 12, the controller 110 is communicably connected to each of the printer unit 11, the control panel 12, and the wireless tag communication device 13. The controller 110 includes a processor 1101, a memory 1102, a data receiving circuit 1103, and an image data expansion circuit 1104.

The processor 1101 is, for example, a central processing unit (CPU), an application specific integrated circuit (ASIC), or the like. The processor 1101 controls each of the printer unit 11, the control panel 12, and the wireless tag communication device 13 in accordance with the image processing program stored in the memory 1102. The controller 110 outputs, for example, conveyance start information indicating that the conveyance of the print medium is started.

The memory 1102 includes a read only memory (ROM), a random access memory (RAM), a hard disk drive (HDD), a solid state drive (SSD), or the like. The memory 1102 may be separate from the controller 110.

The data receiving circuit 1103 receives print data (e.g., data written in a page description language) indicating images to be printed from a host such as a personal computer (PC), and stores the received print data in the memory 1102.

The image data expansion circuit 1104 expands the print data including print parameters stored in the memory 1102 by the data receiving circuit 1103 into printable data (for example, raster data) that can be printed by the printer unit 11, and stores the data in the memory 1102.

In one embodiment, the functions of the data receiving circuit 1103 and the image data expansion circuit 1104 may be performed by the processor 1101.

(Processing of Changing Setting Temperature of Heating Unit)

Figure 13:
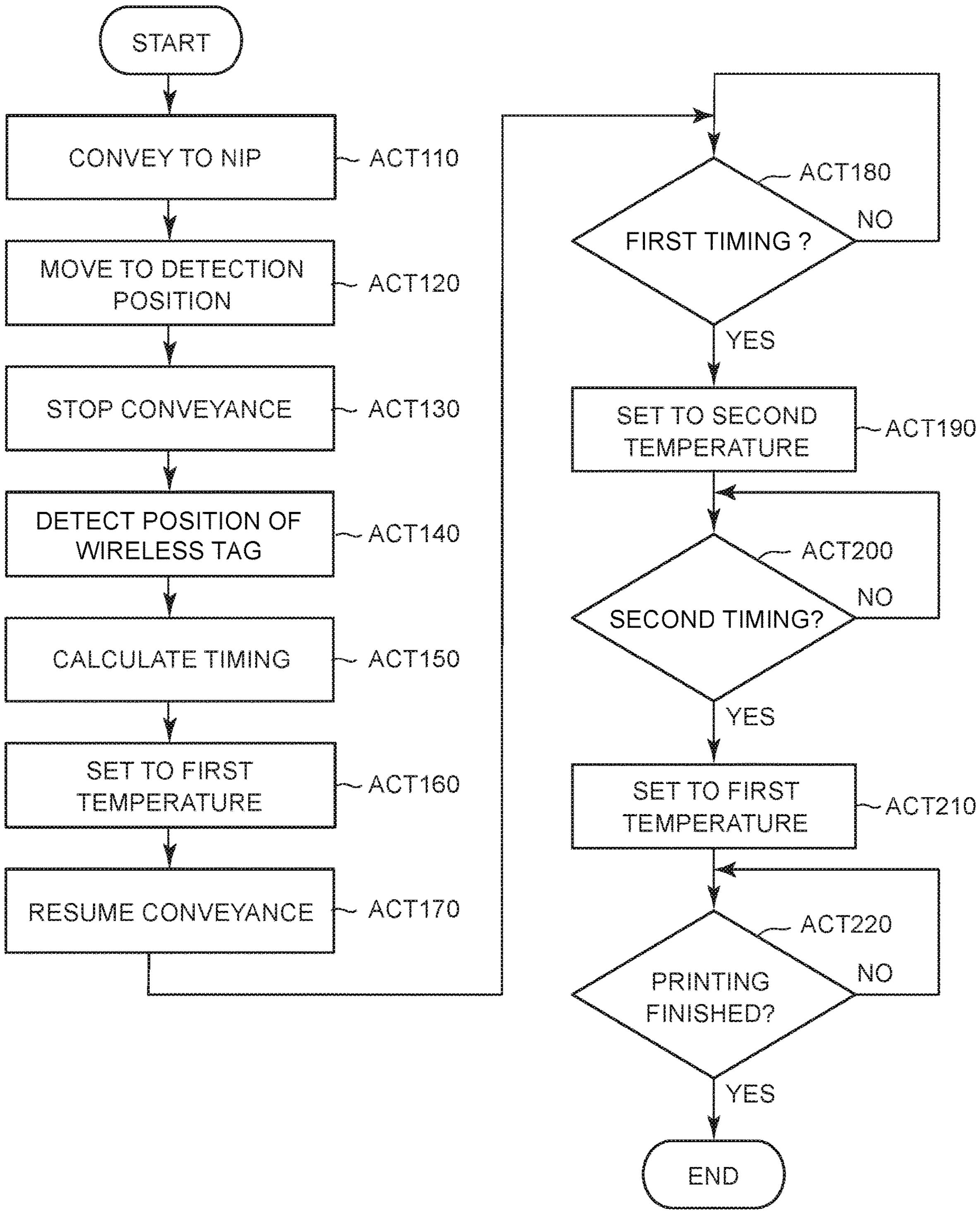
FIG. 13 is a flowchart of a process performed by the image forming apparatus to change the set temperature of the heating unit.

Referring to FIG. 13, a process in which the image forming apparatus 1 changes the setting temperature of the heating unit HT in the conveyance of the print medium will be described. The image forming apparatus 1 performs, for example, the processing of the flowchart illustrated in FIG. 13 every time printing is performed on an individual print medium. In the flowchart shown in FIG. 13, in order to clarify the flow of the processing, the flow of processing for forming an image on a print medium is omitted. As an example, a description will be given of a case where the image forming apparatus 1 receives a print job instructing printing on a print medium stored in the sheet feed cassette 111 at a timing prior to ACT110 process illustrated in FIG. 13. In the present embodiment, the print medium is a print medium to which a wireless tag is attached, as described above. As an example, a case where the number of wireless tags attached to a print medium is one will be described. The number of wireless tags applied to the print medium may be two or more.

After receiving the print job, the controller 110 controls the rollers positioned upstream of the two registration rollers 24 among the rollers positioned on the conveyance path, and conveys the print medium to the nip until the print medium stops at the nip of the two registration rollers 24 (ACT110).

Next, the controller 110 controls the two registration rollers 24 to move the print medium until the leading edge of the print medium deflected in ACT110 coincides with or reaches the detection position (ACT120).

Next, the controller 110 stops the rotation of the two registration rollers 24, and stops the movement of the print medium by the two registration rollers 24 until the above-described detection period elapses (ACT130).

Next, the controller 110 controls the wireless tag communication device 13 to detect a received signal strength as wireless tag position information. The method by which the wireless tag communication device 13 detects the received signal strength may be a known method or a method developed from now on. After detecting the wireless tag position information, the controller 110 detects the position of the wireless tag based on the received signal strength detected as the wireless tag position information by the above-described methods (ACT140). After detecting the position of the wireless tag, the controller 110 identifies at least the second region among the first region and the second region based on the detection position of the wireless tag. When two or more wireless tags are attached to the print medium, the controller 110 identifies each of the two or more second regions based on the detection positions of the two or more wireless tags. After detecting the position of the wireless tag, the controller 110 waits until the elapsed time after stopping the transfer of the print medium in ACT130 exceeds the detected time.

Next, the controller 110 calculates a first timing and a second timing described below based on the received signal strength detected as the wireless tag position information in ACT140 (ACT150). The first timing is a timing at which the wireless tag attached to the print medium enters a target area (described later) when the conveyance of the print medium is resumed. In the image forming apparatus 1, the first timing is indicated by, for example, an elapsed time from when the conveyance of the print medium is resumed until the wireless tag enters the target area. In the image forming apparatus 1, the first timing may be indicated by other information indicating the timing instead of the elapsed time. In this case, the second timing is a timing at which the wireless tag attached to the print medium exits the target area. In the image forming apparatus 1, the second timing is indicated by, for example, an elapsed time from when the conveyance of the print medium is resumed until the wireless tag comes out to the target area. In the image forming apparatus 1, the second timing may be indicated by other information indicating the timing instead of the elapsed time.

The target area is a section between the above-described heating position and a position before the first distance from the heating position on the conveyance path. As will be described later, the image forming apparatus 1 sets the set temperature of the heating unit HT to a predetermined first temperature while the first region of the print medium passes through the target area on the conveyance path. On the other hand, as will be described later, the image forming apparatus 1 sets the set temperature of the heating unit HT to a second temperature lower than the first temperature while the second region of the print medium passes through the target area. Each of the first temperature and the second temperature is a temperature within a temperature range in which the fixing failure of the toner image to the print medium does not occur and the failure of the IC tip included in the wireless tag does not occur. The temperature range is, for example, 120 to 135° C. The temperature range varies depending on a combination of the type of the print medium and the type of the toner. Therefore, the temperature range of 120 to 135° C. is only an example of the temperature range. When the temperature range is 120 to 135° C., the first temperature is, for example, 135° C. of the maximum temperature in the temperature range. In this case, the second temperature is, for example, 125° C. which is 10° C. lower than the first temperature. The first temperature may be a temperature lower than the maximum temperature in the temperature range as long as the temperature is higher than the second temperature in the temperature range. However, it is desirable that the first temperature is higher within the temperature range. The second temperature may be any temperature as long as it is lower than the first temperature within the temperature range. However, it is desirable that the second temperature is lower in the temperature range.

The first distance is a distance determined in advance according to the configuration of the fixing device AD. Specifically, the first distance is a length of a part of the outer periphery of the fixing member ADA that is not in contact with the heating element HE of the heating unit HT when the fixing member ADA that is not rotating is viewed in the axial direction of the rotating shaft of the fixing member. For convenience of explanation, the portion is referred to as a non-heating portion, and a portion of the outer periphery of the fixing member ADA in the case where the portion is in contact with the heating element HE of the heating unit HT is referred to as a heating portion. For example, when the configuration of the fixing device AD has the lamp-type configuration as illustrated in FIGS. 4 to 6, the heating portion is only a portion of the outer periphery of the fixing member ADA that is located at the heating position HP. Thus, the length of the unheated part then approximately matches the length of the circumference of a circle having the same radius as the rotation radius of the fixing member ADA viewed axially. Thus, the first distance in this case is the length of the circumference of the circle. For example, if the radius of the fixing member ADA is 15 mm, the first distance is about 94.25 mm. On the other hand, when the fixing device AD has the configuration of the IH type as shown in FIG. 7, the heated part is about half of the outer periphery of the fixing member ADA viewed in the axial direction. Thus, the length of the non-heating portion then approximately matches half the length of the circumference of a circle having the same radius as the rotation radius of the fixing member ADA viewed axially. Thus, the first distance in this case is half the length of the circumference of the circle. For example, if the radius of the fixing member ADA is 15 mm, the first distance is about 47.13 mm.

The controller 110 calculates each of the first timing and the second timing on the basis of the conveyance rate of the print medium set in accordance with the print job received in advance and the position of the wireless tag detected in ACT140. Specifically, the controller 110 calculates a distance between the position of the end portion of the target area on the upstream side of the conveyance path and the position of the wireless tag, and calculates a first timing based on the calculated distance and the conveyance speed. On the other hand, the controller 110 calculates the distance between the position of the end portion of the target area on the downstream side of the conveyance path, that is, the heating position, and the position of the wireless tag, and calculates the second timing based on the calculated distance and the conveyance speed. When a plurality of wireless tags are attached to the print medium, the controller 110 calculates the first timing and the second timing for each of the two or more second regions.

After ACT150 process is performed, the controller 110 sets the set temperature of the heating unit HT to the first temperature (ACT160).

Next, the controller 110 controls the conveyance unit to resume the conveyance of the print medium (ACT170).

Next, the controller 110 waits until the elapsed time from the timing resumed in ACT170 coincides with the first timing calculated in ACT150 (ACT180).

If it is determined that the elapsed time matches the first timing (ACT180—YES), the controller 110 resets the set temperature of the heating unit HT from the first temperature to the second temperature (ACT190).

Next, the controller 110 waits until the elapsed time from the timing resumed in ACT170 coincides with the second timing calculated in ACT150 (ACT200).

If it is determined that the elapsed time matches the second timing (ACT200—YES), the controller 110 resets the set temperature of the heating unit HT from the second temperature to the first temperature (ACT210).

Next, the controller 110 waits until the printing on the print medium is completed (ACT220). The method by which the controller 110 determines whether printing on the print medium is completed may be a known method or a method developed from now on.

When it is determined that printing on the print medium has been completed (ACT220—YES), the controller 110 ends the process of the flow chart shown in FIG. 13.

Figure 14:
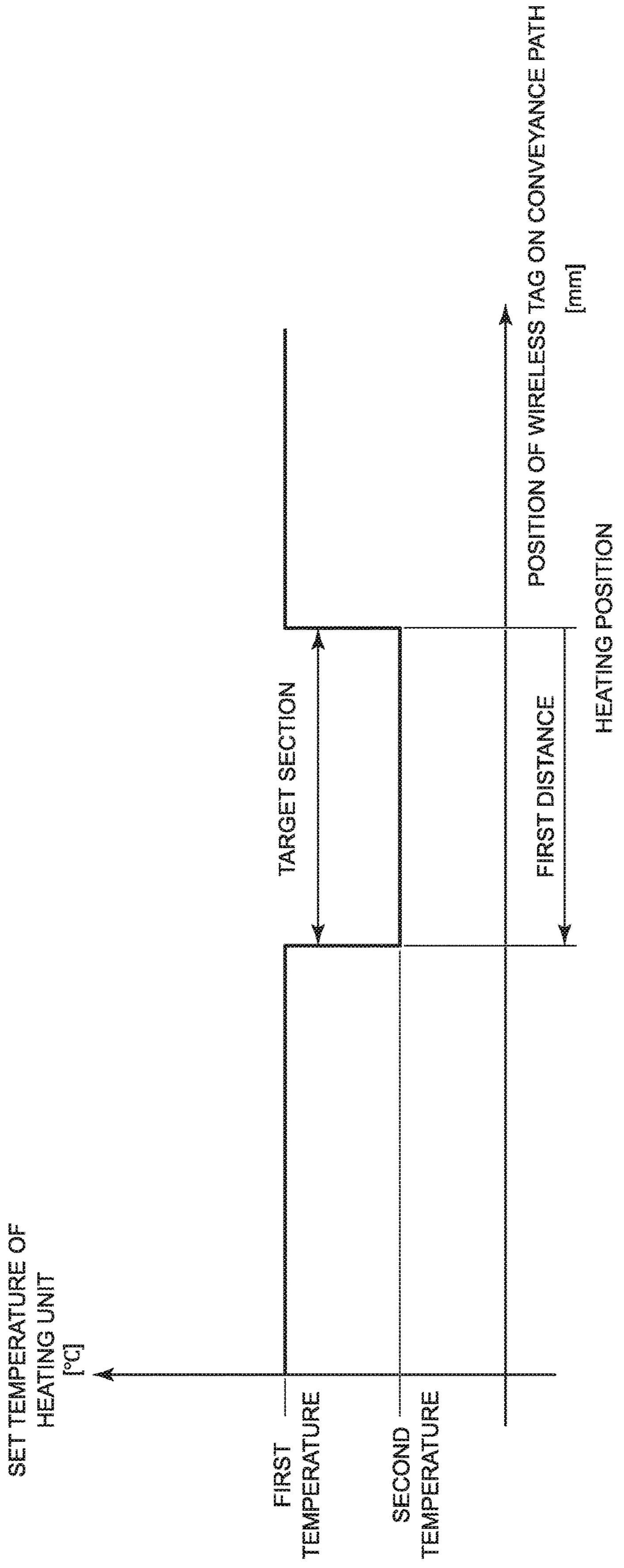
FIG. 14 depicts an example of controlling the set temperature of the heating unit by the image forming apparatus.

As described above, in the image forming apparatus 1, in the heating of the print medium by the heating unit HT, the temperature for heating the second region including the wireless tag on the print medium is set to be lower than the temperature for heating the first region not including the wireless tag on the print medium. FIG. 14 is a graph illustrating an example of how the image forming apparatus 1 lowers the set temperature of the heating unit HT from the first temperature to the second temperature when the second region of the print medium passes through the target area. The vertical axis of the graph illustrated in FIG. 14 indicates the set temperature of the heating unit HT. The horizontal axis of the graph indicates the position of the wireless tag on the conveyance path when the heating position is set as the origin. As illustrated in FIG. 14, when the position of the wireless tag is included in the target area, the image forming apparatus 1 lowers the set temperature of the heating unit HT from the first temperature to the second temperature. As a result, the image forming apparatus 1 can prevent the wireless tag attached to the print medium from malfunctioning due to heat.

When two or more wireless tags are attached to the print medium, the image forming apparatus 1 lowers the set temperature of the heating unit HT from the first temperature to the second temperature, for example, for each of the two or more second regions. Accordingly, even in this case, the image forming apparatus 1 can prevent the wireless tags attached to the print medium from malfunctioning due to heat.

Figure 15:
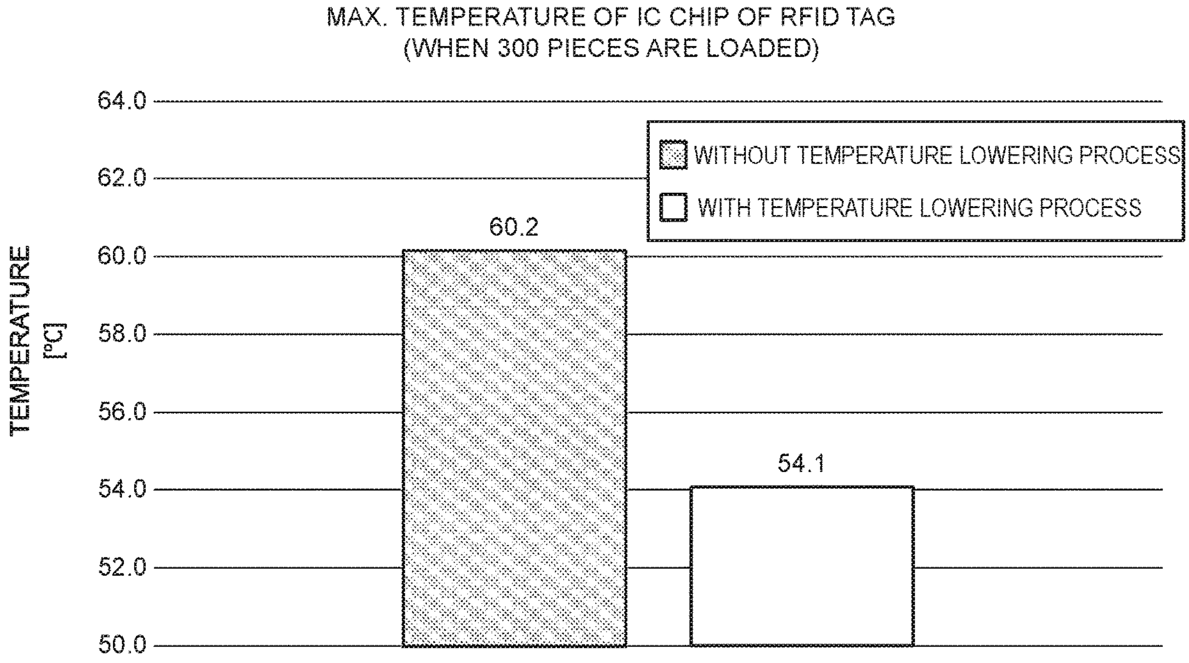
FIG. 15 depicts a comparison chart of the maximum temperatures of the wireless tags attached to the print media stacked on the sheet discharge tray when the temperature lowering process is and is not performed.

FIG. 15 is a diagram comparing the maximum temperature of the wireless tags of print media stacked on the sheet discharge tray TB when the temperature lowering process is performed and the maximum temperature of the wireless tags of print media stacked on the sheet discharge tray TB when the temperature lowering process is not performed. The temperature lowering process is shown in the flowchart in FIG. 13. When the temperature lowering process is not performed, the image forming apparatus 1 conveys the print medium while keeping the set temperature of the heating unit HT at the first temperature.

The vertical axis of the graph illustrated in FIG. 15 indicates the maximum temperature of IC chip of the wireless tag attached to each print medium immediately after 300 sheets of the print media are stored and stacked on the sheet discharge tray TB. In the example shown in FIG. 15, when the temperature lowering process was not performed, the maximum temperature was 60.2° C. On the other hand, in this example, when the temperature lowering process was performed, the maximum temperature was 54.1° C. In other words, the image forming apparatus 1 can lower the maximum temperature of IC chip of the wireless tag attached to the print medium by performing the temperature lowering process. As a result, the image forming apparatus 1 can prevent the wireless tag attached to the print medium from malfunctioning due to heat.

In the image forming apparatus 1 described above, the controller 110 may receive the wireless tag position information by an operation from the user. In this case, the wireless tag position information includes information indicating whether the surface of the print medium on which the wireless tag is attached is the front surface or the back surface.

In the image forming apparatus 1 described above, the controller 110 may be configured to specify the wireless tag position information according to the type of the print medium when the type of the print medium is received. In this case, the image forming apparatus 1 stores in advance information in which the type of the print medium and the wireless tag position information are associated with each other.

In the above-described embodiments, the position of the wireless tag may be read as the position of IC chip included in the wireless tag.

As described above, the image forming apparatus includes a conveyance unit, an image forming unit, a fixing device, and a controller. The conveyance unit conveys a print medium to which a wireless tag is attached. The image forming unit forms an image on the print medium. The fixing device includes a heating unit that heats the print medium, and heats the print medium by the heating unit at a heating position on the conveyance path where the print medium is conveyed, and fixes the image formed on the print medium. In the heating of the print medium by the heating unit, the controller heats a second region including the wireless tag on the print medium lower than a temperature that heats a first region not including the wireless tag on the print medium.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

A program for performing the above-described functions by a processor of an apparatus such as the image forming apparatus 1 may be recorded in a non-transitory computer-readable recording medium, and the program may be read and executed by the processor The term “computer system” as used herein includes software such as an operating system (OS) and hardware such as peripheral devices. A “computer-readable recording medium” refers to a portable medium such as a flexible disk, a magneto-optical disk, CD-ROM, or a storage device such as a hard disk built in a computer system. A “computer-readable recording medium” includes a medium that stores a program for a certain period of time, such as a memory in a computer system that serves as a server or client when the program is transmitted via a network such as the Internet or a communication line such as a telephone line.

The above-described program may be transmitted from a computer system in which the program is stored in its storage device or the like via a wired and/or wireless network such as a LAN, the Internet, a communication line, etc. The above-described program may be for performing a part of the above-described functions. The above-described program may be a so-called difference file or module that can perform one or more of the above-described functions in combination with the program already recorded in a computer system.

What is claimed is:

1. An image forming apparatus configured to form an image on a medium and write data to a wireless tag attached to the medium, comprising:

a fixing device including a heater; and a controller configured to:

upon detection of a first wireless tag attached to a medium, determine a first distance between an upstream end of the medium and a first region of the medium to which the first wireless tag is attached based on a strength of a signal received from the first wireless tag, and determine a first timing at which the first region begins to pass the fixing device based on the first distance and a second timing at which the first region completely passes the fixing device based on the first distance, and control the fixing device to heat the medium at a first temperature before the first timing and after the second timing and at a second temperature that is lower than the first temperature between the first and second timings.

2. The image forming apparatus according to claim 1, wherein the fixing device includes an endless belt in which the heater is disposed and a pressing roller facing the endless belt.

3. The image forming apparatus according to claim 1, further comprising:

a wireless tag communication device configured to communicate with the first wireless tag and measure the strength of the signal received from the first wireless tag.

4. The image forming apparatus according to claim 1, wherein the medium includes a second wireless tag at a location farther from the upstream end of the medium than the first wireless tag, and the controller is configured to:

upon detection of the second wireless tag, determine a second distance between the upstream end of the medium and a second region of the medium to which the second wireless tag is attached based on a strength of a signal received from the second wireless tag, and determine a third timing at which the second region begins to pass the fixing device based on the first distance and a fourth timing at which the second region completely passes the fixing device based on the second distance, and control the fixing device to heat the medium at the first temperature before the third timing and after the fourth timing and at the second temperature between the third and fourth timings.

5. The image forming apparatus according to claim 1, wherein the first and second temperatures are between 120 and 135 degrees Celsius.

6. The image forming apparatus according to claim 5, wherein the second temperature is at least 10 degrees lower than the first temperature.

7. The image forming apparatus according to claim 1, wherein the heater includes a plurality of heating elements arranged along a longitudinal direction of the heater, and the heating elements include a first element, a second element, and a third element that is between the first and second elements and longer than the first and second elements.

8. The image forming apparatus according to claim 1, wherein the heater includes a plurality of heating elements arranged along a direction perpendicular to a longitudinal direction of the heater, and the heating elements include a first element extending along the longitudinal direction, a second element extending parallel to the first element, and a third element extending parallel to the first and second elements and shorter than the first and second elements.

9. The image forming apparatus according to claim 1, wherein the heater includes a plurality of heating elements each extending along a longitudinal direction of the heater and having a convex lens shape.

10. The image forming apparatus according to claim 1, further comprising:

a conveyor, wherein the controller is configured to, before the first timing, control the conveyor to convey the medium until the medium reaches the fixing device, then determine the first distance, then control the fixing device to heat the medium at the first temperature, and then control the conveyor to further convey the medium.

11. A method carried out by an image forming apparatus configured to form an image on a medium and write data to a wireless tag attached to the medium and including a fixing device with a heater, the method comprising:

upon detection of a first wireless tag attached to a medium, determining a first distance between an upstream end of the medium and a first region of the medium to which the first wireless tag is attached based on a strength of a signal received from the first wireless tag, and determining a first timing at which the first region begins to pass the fixing device based on the first distance and a second timing at which the first region completely passes the fixing device based on the first distance;

before the first timing, heating the medium at a first temperature;

between the first and second timings, heating the medium at a second temperature that is lower than the first temperature; and after the second timing, heating the medium at the first temperature.

12. The method according to claim 11, wherein the fixing device includes an endless belt in which the heater is disposed and a pressing roller facing the endless belt.

13. The method according to claim 11, further comprising:

communicating with the first wireless tag and measuring the strength of the signal received from the first wireless tag by a wireless tag communication device.

14. The method according to claim 11, wherein the medium includes a second wireless tag at a location farther from the upstream end of the medium than the first wireless tag, and the method further comprises:

upon detection of the second wireless tag, determining a second distance between the upstream end of the medium and a second region of the medium to which the second wireless tag is attached based on a strength of a signal received from the second wireless tag, and determining a third timing at which the second region begins to pass the fixing device based on the second distance and a fourth timing at which the second region completely passes the fixing device based on the second distance;

before the third timing, heating the medium at the first temperature;

between the third and fourth timings, heating the medium at the second temperature; and after the fourth timing, heating the medium at the first temperature.

15. The method according to claim 11, wherein the first and second temperatures are between 120 and 135 degrees Celsius.

16. A non-transitory computer readable medium storing a program causing a computer to execute a method of forming an image on a medium and writing data to a wireless tag attached to the medium, the method comprising:

upon detection of a first wireless tag attached to a medium, determining a first distance between an upstream end of the medium and a first region of the medium to which the first wireless tag is attached based on a strength of a signal received from the first wireless tag, and determining a first timing at which the first region begins to pass a fixing device based on the first distance and a second timing at which the first region completely passes the fixing device based on the first distance;

before the first timing, heating the medium at a first temperature;

between the first and second timings, heating the medium at a second temperature that is lower than the first temperature; and after the second timing, heating the medium at the first temperature.

* * * * *